United States Patent
Koorapati et al.

(10) Patent No.: US 10,819,559 B2
(45) Date of Patent: Oct. 27, 2020

(54) APPARENT CLOUD ACCESS FOR HOSTED CONTENT ITEMS

(71) Applicant: Dropbox, Inc., San Francisco, CA (US)

(72) Inventors: Nipunn Koorapati, San Francisco, CA (US); Christopher Rude, Seattle, WA (US); Marcio von Muhlen, San Francisco, CA (US); Nils Bunger, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/870,365

(22) Filed: Jan. 12, 2018

(65) Prior Publication Data
US 2018/0139085 A1    May 17, 2018

Related U.S. Application Data (63) Continuation of application No. 15/355,305, filed on Nov. 18, 2016, now Pat. No. 9,882,770, which is a
(Continued)

(51) Int. Cl.
*G06F 15/16* (2006.01)
*H04L 12/24* (2006.01)
(Continued)

(52) U.S. Cl.
CPC .......... *H04L 41/046* (2013.01); *G06F 16/182* (2019.01); *H04L 67/02* (2013.01);
(Continued)

(58) Field of Classification Search
CPC ...................................................... H04L 41/046
(Continued)

(56) References Cited

U.S. PATENT DOCUMENTS

| 5,893,116 A | 4/1999 | Simmonds |
| 5,907,848 A | 5/1999 | Zaiken |
(Continued)

FOREIGN PATENT DOCUMENTS

| EP | 1 517 260 A2 | 3/2005 |
| FR | 2924244 A1 | 5/2009 |
(Continued)

OTHER PUBLICATIONS

White, Tom, "Chapter 3: The Hadoop Distributed Filesystem, In: Hadoop—The Definitive Guide", dated Apr. 17, 2015, pp. 43-78.
(Continued)

*Primary Examiner* — Imad Hussain
(74) *Attorney, Agent, or Firm* — Hickman Palermo Becker Bingham LLP; Adam C. Stone (57) ABSTRACT

Techniques for apparent cloud access of a hosted content item. In one embodiment, for example, a method performed at a personal computing device executing a user agent comprises: receiving a block agent request for a content item from the user agent; determining content item block identifiers of content item blocks that make up the content item; determining which, if any, of the content item blocks that make up the content item are not stored in a local storage of the personal computing device; downloading, from a block server of an online content management system, any of the content item blocks that are not stored in a local storage of the personal computing device; and sending to the user agent, in a response to the block agent request, data of each of the content item blocks that make up the content item.

20 Claims, 5 Drawing Sheets

Related U.S. Application Data continuation of application No. 15/010,235, filed on Jan. 29, 2016, now Pat. No. 9,537,952.

(51) Int. Cl.
*G06F 16/182* (2019.01)
*H04L 29/08* (2006.01)

(52) U.S. Cl.
CPC .......... *H04L 67/06* (2013.01); *H04L 67/1097* (2013.01); *H04L 67/32* (2013.01)

(58) Field of Classification Search
USPC ........................................................ 709/202
See application file for complete search history.

(56) References Cited

U.S. PATENT DOCUMENTS

| | | | |
|---|---|---|---|
| 5,926,821 A | 7/1999 | Hirose | |
| 6,061,743 A | 5/2000 | Thatcher | |
| 6,065,018 A | 5/2000 | Beier | |
| 6,108,703 A | 8/2000 | Leighton et al. | |
| 6,336,173 B1 | 1/2002 | Day | |
| 6,470,329 B1 | 10/2002 | Livschitz | |
| 6,473,426 B1 | 10/2002 | Killian | |
| 6,560,591 B1 | 5/2003 | Memmott et al. | |
| 6,728,723 B1 | 4/2004 | Kathail et al. | |
| 6,834,284 B2 | 12/2004 | Acker et al. | |
| 6,915,315 B2 | 7/2005 | Autery | |
| 7,035,847 B2 | 4/2006 | Brown | |
| 7,117,303 B1 | 10/2006 | Zayas | |
| 7,308,545 B1 | 12/2007 | Kekre | |
| 7,318,134 B1 | 1/2008 | Oliveira | |
| 7,340,723 B2 | 3/2008 | Antonov et al. | |
| 7,401,089 B2 | 7/2008 | Benton et al. | |
| 7,512,638 B2 | 3/2009 | Jhaveri et al. | |
| 7,558,926 B1 | 7/2009 | Oliveira | |
| 7,599,941 B2 | 10/2009 | Bahar et al. | |
| 7,685,171 B1 | 3/2010 | Beaverson et al. | |
| 7,689,510 B2 | 3/2010 | Lamkin | |
| 7,716,180 B2 | 5/2010 | Vermeulen et al. | |
| 7,814,499 B2 | 10/2010 | Straube | |
| 7,865,571 B2 | 1/2011 | Ho | |
| 7,869,425 B2 | 1/2011 | Elliott | |
| 7,870,355 B2 | 1/2011 | Erofeev | |
| 7,890,646 B2 | 2/2011 | Khosravy | |
| 7,925,966 B2 | 4/2011 | Kaler et al. | |
| 7,937,686 B2 | 5/2011 | Sorensen et al. | |
| 7,953,785 B2 | 5/2011 | Li et al. | |
| 8,015,491 B2 | 9/2011 | Shaver | |
| 8,019,900 B1 | 9/2011 | Sekar | |
| 8,082,231 B1 | 12/2011 | McDaniel et al. | |
| 8,112,505 B1 * | 2/2012 | Ben-Shaul .......... | G06F 16/1767 709/219 |
| 8,140,473 B2 | 3/2012 | Sun | |
| 8,214,747 B1 | 7/2012 | Yankovich | |
| 8,301,597 B1 | 10/2012 | Zhou | |
| 8,307,028 B2 | 11/2012 | Kakivaya et al. | |
| 8,312,046 B1 | 11/2012 | Eisler et al. | |
| 8,341,532 B2 | 12/2012 | Ryan | |
| 8,429,540 B1 | 4/2013 | Yankovich | |
| 8,458,299 B2 | 6/2013 | Lin et al. | |
| 8,484,260 B2 | 7/2013 | Caso | |
| 8,503,984 B2 | 8/2013 | Winbush, III | |
| 8,527,549 B2 * | 9/2013 | Cidon .................. | G06F 16/178 707/802 |
| 8,650,159 B1 | 2/2014 | Zhang et al. | |
| 8,656,218 B2 | 2/2014 | Erofeev | |
| 8,661,428 B2 | 2/2014 | Clark | |
| 8,713,106 B2 | 4/2014 | Spataro | |
| 8,805,793 B2 | 8/2014 | Patiejunas et al. | |
| 8,819,587 B1 | 8/2014 | Shrum | |
| 8,825,597 B1 | 9/2014 | Houston et al. | |
| 8,847,799 B1 | 10/2014 | Derbeko et al. | |
| 8,880,538 B1 | 11/2014 | Petersson et al. | |
| 8,892,679 B1 | 11/2014 | Destagnol | |
| 8,930,412 B2 | 1/2015 | Nelson | |
| 8,949,179 B2 | 2/2015 | Besen | |
| 8,949,208 B1 | 2/2015 | Teng et al. | |
| 8,959,067 B1 | 2/2015 | Patiejunas et al. | |
| 8,959,607 B2 | 2/2015 | Patiejunas et al. | |
| 9,037,556 B2 | 5/2015 | Castellano et al. | |
| 9,037,797 B2 | 5/2015 | McGroddy-Goetz et al. | |
| 9,043,567 B1 | 5/2015 | Modukuri | |
| 9,183,303 B1 | 11/2015 | Goel | |
| 9,185,164 B1 | 11/2015 | Newhouse | |
| 9,213,709 B2 | 12/2015 | Patiejunas et al. | |
| 9,253,166 B2 | 2/2016 | Gauda | |
| 9,282,169 B1 | 3/2016 | Chang | |
| 9,286,102 B1 * | 3/2016 | Harel .................. | G06F 9/45558 |
| 9,294,558 B1 | 3/2016 | Vincent et al. | |
| 9,361,349 B1 | 6/2016 | Newhouse | |
| 9,384,226 B1 | 7/2016 | Goel et al. | |
| 9,479,548 B2 | 10/2016 | Swanson | |
| 9,479,567 B1 * | 10/2016 | Koorapati .......... | G06F 16/1844 |
| 9,479,578 B1 | 10/2016 | Swanson et al. | |
| 9,563,681 B1 | 2/2017 | Patiejunas et al. | |
| 9,697,269 B2 * | 7/2017 | Koorapati ............... | H04L 67/06 |
| 9,727,470 B1 * | 8/2017 | Cande .................. | G06F 3/0643 |
| 9,817,878 B2 | 11/2017 | Newhouse | |
| 9,819,740 B2 | 11/2017 | Tataroiu | |
| 9,852,147 B2 | 12/2017 | Von Muhlen | |
| 9,852,150 B2 * | 12/2017 | Sharpe ................. | G06F 3/0611 |
| 10,116,732 B1 | 10/2018 | Canton et al. | |
| 2002/0048174 A1 | 6/2002 | Sim | |
| 2002/0078174 A1 * | 6/2002 | Sim ...................... | H04L 47/125 709/219 |
| 2002/0112058 A1 | 8/2002 | Weisman | |
| 2002/0120763 A1 | 8/2002 | Miloushev | |
| 2002/0174180 A1 | 11/2002 | Brown | |
| 2003/0018878 A1 | 1/2003 | Dorward | |
| 2004/0024786 A1 | 2/2004 | Anderson | |
| 2004/0034712 A1 * | 2/2004 | Rajwan ................ | H04L 1/0007 709/231 |
| 2004/0064488 A1 | 4/2004 | Sinha | |
| 2004/0068523 A1 | 4/2004 | Keith | |
| 2004/0133573 A1 | 7/2004 | Miloushev | |
| 2004/0133606 A1 | 7/2004 | Miloushev | |
| 2004/0133607 A1 | 7/2004 | Miloushev | |
| 2004/0133652 A1 | 7/2004 | Miloushev | |
| 2004/0162900 A1 | 8/2004 | Bucher | |
| 2005/0071336 A1 | 3/2005 | Najork | |
| 2005/0262371 A1 | 11/2005 | Luke | |
| 2005/0289237 A1 | 12/2005 | Matsubara | |
| 2006/0041844 A1 | 2/2006 | Homiller | |
| 2006/0179083 A1 | 8/2006 | Kulkarni | |
| 2006/0206547 A1 | 9/2006 | Kulkarni | |
| 2007/0024919 A1 | 2/2007 | Wong | |
| 2007/0028215 A1 | 2/2007 | Kamath | |
| 2007/0043747 A1 | 2/2007 | Benton | |
| 2007/0055703 A1 | 3/2007 | Zimran | |
| 2007/0079083 A1 | 4/2007 | Gladwin et al. | |
| 2007/0088702 A1 | 4/2007 | Fridella | |
| 2007/0100829 A1 | 5/2007 | Allen | |
| 2007/0100913 A1 * | 5/2007 | Sumner ............... | G06F 11/1453 |
| 2007/0136308 A1 | 6/2007 | Tsirigotis et al. | |
| 2007/0198710 A1 | 8/2007 | Gopalakrishnan | |
| 2007/0214497 A1 | 9/2007 | Montgomery et al. | |
| 2007/0220220 A1 | 9/2007 | Ziv et al. | |
| 2007/0250552 A1 * | 10/2007 | Lango ................. | H04L 67/2842 |
| 2007/0294366 A1 | 12/2007 | Ozzie et al. | |
| 2008/0005195 A1 | 1/2008 | Li | |
| 2008/0046218 A1 | 2/2008 | Dontcheva | |
| 2008/0141250 A1 | 6/2008 | Dorn | |
| 2008/0208870 A1 | 8/2008 | Tsang | |
| 2008/0212616 A1 | 9/2008 | Augustine et al. | |
| 2008/0267221 A1 | 10/2008 | Ozzie et al. | |
| 2009/0030986 A1 | 1/2009 | Bates | |
| 2009/0037514 A1 | 2/2009 | Lankford et al. | |
| 2009/0055464 A1 | 2/2009 | Multer | |
| 2009/0083394 A1 * | 3/2009 | Diot .................... | H04L 12/1859 709/218 |
| 2009/0094252 A1 | 4/2009 | Wong | |
| 2009/0125522 A1 | 5/2009 | Kodama et al. | |

(56) References Cited

U.S. PATENT DOCUMENTS

| | | | |
|---|---|---|---|
| 2009/0138529 A1 | 5/2009 | Bellessort | |
| 2009/0144784 A1* | 6/2009 | Li | H04N 7/17318 725/97 |
| 2009/0192845 A1 | 7/2009 | Gudipaty | |
| 2009/0216745 A1 | 8/2009 | Allard | |
| 2009/0222741 A1 | 9/2009 | Shaw | |
| 2009/0271412 A1 | 10/2009 | Lacapra | |
| 2009/0271502 A1* | 10/2009 | Xue | H04L 67/104 709/219 |
| 2009/0271779 A1* | 10/2009 | Clark | G06F 8/71 717/171 |
| 2009/0300071 A1 | 12/2009 | Arcese | |
| 2009/0313353 A1* | 12/2009 | Lou | G06F 21/10 709/219 |
| 2009/0327405 A1 | 12/2009 | FitzGerald | |
| 2010/0011088 A1* | 1/2010 | Gautier | H04L 1/1809 709/217 |
| 2010/0146569 A1* | 6/2010 | Janardhan | H04N 7/17318 725/98 |
| 2010/0198944 A1* | 8/2010 | Ho | H04L 12/189 709/217 |
| 2010/0241711 A1 | 9/2010 | Ansari | |
| 2010/0293147 A1 | 11/2010 | Snow et al. | |
| 2010/0332401 A1 | 12/2010 | Prahlad et al. | |
| 2011/0153759 A1 | 6/2011 | Rathod | |
| 2011/0154431 A1 | 6/2011 | Walsh | |
| 2011/0225293 A1 | 9/2011 | Rathod et al. | |
| 2011/0258488 A1 | 10/2011 | Nightingale et al. | |
| 2012/0084379 A1 | 4/2012 | Peng et al. | |
| 2012/0151201 A1* | 6/2012 | Clerc | G06F 9/441 713/2 |
| 2012/0197844 A1* | 8/2012 | Wang | G06F 11/2097 707/646 |
| 2012/0203817 A1 | 8/2012 | Hu | |
| 2012/0221520 A1 | 8/2012 | Garrett | |
| 2012/0221811 A1 | 8/2012 | Sparkes | |
| 2012/0226649 A1 | 9/2012 | Kovacs | |
| 2013/0013560 A1 | 1/2013 | Goldberg | |
| 2013/0014023 A1 | 1/2013 | Lee et al. | |
| 2013/0041872 A1 | 2/2013 | Aizman | |
| 2013/0080919 A1 | 3/2013 | Kiang | |
| 2013/0094445 A1 | 4/2013 | De Foy | |
| 2013/0135608 A1 | 5/2013 | Payne | |
| 2013/0138608 A1 | 5/2013 | Smith | |
| 2013/0160072 A1 | 6/2013 | Reus | |
| 2013/0191339 A1 | 7/2013 | Haden | |
| 2013/0198600 A1 | 8/2013 | Lockhart | |
| 2013/0212112 A1 | 8/2013 | Blom | |
| 2013/0212484 A1 | 8/2013 | Joshi | |
| 2013/0212485 A1 | 8/2013 | Yankovich | |
| 2013/0218837 A1* | 8/2013 | Bhatnagar | G06F 16/178 707/624 |
| 2013/0227083 A1 | 8/2013 | Kim | |
| 2013/0268480 A1 | 10/2013 | Dorman | |
| 2013/0275398 A1 | 10/2013 | Dorman | |
| 2013/0275509 A1 | 10/2013 | Miccucci | |
| 2013/0318229 A1 | 11/2013 | Bakre et al. | |
| 2013/0332418 A1 | 12/2013 | Kim | |
| 2013/0339407 A1* | 12/2013 | Sharpe | G06F 3/0611 707/827 |
| 2013/0346374 A1* | 12/2013 | Wolf | G06F 16/1752 707/685 |
| 2013/0346557 A1* | 12/2013 | Chang | G06F 9/45558 709/217 |
| 2014/0025948 A1* | 1/2014 | Bestler | H04L 9/0863 713/167 |
| 2014/0046906 A1 | 2/2014 | Patiejunas et al. | |
| 2014/0047070 A1* | 2/2014 | Lee | H04L 67/02 709/219 |
| 2014/0053227 A1 | 2/2014 | Ruppin | |
| 2014/0059642 A1 | 2/2014 | Deasy | |
| 2014/0074663 A1 | 3/2014 | Alsina | |
| 2014/0074783 A1 | 3/2014 | Alsina | |
| 2014/0115115 A1* | 4/2014 | Kuang | H04L 65/1083 709/219 |
| 2014/0122428 A1 | 5/2014 | Zhou | |
| 2014/0126800 A1 | 5/2014 | Lang et al. | |
| 2014/0143446 A1 | 5/2014 | Jacobson | |
| 2014/0156793 A1 | 6/2014 | Chan et al. | |
| 2014/0172783 A1* | 6/2014 | Suzuki | G06F 8/63 707/609 |
| 2014/0173027 A1* | 6/2014 | Kappes | H04L 67/1097 709/217 |
| 2014/0173137 A1 | 6/2014 | Jacobson | |
| 2014/0181697 A1 | 6/2014 | Kirigin | |
| 2014/0188803 A1 | 7/2014 | James et al. | |
| 2014/0195652 A1* | 7/2014 | Yerkes | H04L 67/06 709/219 |
| 2014/0208220 A1 | 7/2014 | Watal | |
| 2014/0215436 A1 | 7/2014 | DeLuca | |
| 2014/0215551 A1 | 7/2014 | Allain | |
| 2014/0215568 A1 | 7/2014 | Kirigin | |
| 2014/0229839 A1 | 8/2014 | Lynch | |
| 2014/0250073 A1 | 9/2014 | Zalpuri et al. | |
| 2014/0280602 A1 | 9/2014 | Quatrano | |
| 2014/0304384 A1 | 10/2014 | Varenhorst et al. | |
| 2014/0304618 A1 | 10/2014 | Carriero | |
| 2014/0324777 A1 | 10/2014 | Novak | |
| 2014/0324945 A1 | 10/2014 | Novak | |
| 2014/0330874 A1* | 11/2014 | Novak | H04L 65/4069 707/827 |
| 2014/0358860 A1* | 12/2014 | Wautier | G06F 16/27 707/638 |
| 2014/0359465 A1 | 12/2014 | Litan | |
| 2014/0365432 A1 | 12/2014 | Jain | |
| 2014/0379586 A1 | 12/2014 | Sawyer | |
| 2015/0006146 A1 | 1/2015 | Wilkes et al. | |
| 2015/0006475 A1* | 1/2015 | Guo | G06F 16/1752 707/609 |
| 2015/0019432 A1 | 1/2015 | Burns | |
| 2015/0052392 A1 | 2/2015 | Mickens et al. | |
| 2015/0058932 A1 | 2/2015 | Faitelson | |
| 2015/0082198 A1 | 3/2015 | Destagnol | |
| 2015/0113222 A1* | 4/2015 | Naik | G06F 12/0808 711/133 |
| 2015/0134808 A1 | 5/2015 | Fushman | |
| 2015/0161016 A1 | 6/2015 | Bulkowski | |
| 2015/0180948 A1 | 6/2015 | Shao | |
| 2015/0186395 A1 | 7/2015 | Yan | |
| 2015/0207844 A1 | 7/2015 | Tataroiu et al. | |
| 2015/0227757 A1* | 8/2015 | Bestler | G06F 21/6227 713/167 |
| 2015/0249647 A1 | 9/2015 | Mityagin et al. | |
| 2015/0254320 A1 | 9/2015 | Cowling | |
| 2015/0278884 A1 | 10/2015 | Manzari et al. | |
| 2015/0288754 A1 | 10/2015 | Mosko et al. | |
| 2015/0288755 A1 | 10/2015 | Mosko et al. | |
| 2015/0347553 A1 | 12/2015 | Aizman | |
| 2015/0358373 A1* | 12/2015 | Famaey | H04N 21/26258 709/231 |
| 2016/0006646 A1 | 1/2016 | Lin | |
| 2016/0021172 A1 | 1/2016 | Mahadevan et al. | |
| 2016/0044126 A1 | 2/2016 | Mahadevan et al. | |
| 2016/0050177 A1 | 2/2016 | Cue | |
| 2016/0055248 A1 | 2/2016 | Goel et al. | |
| 2016/0057217 A1 | 2/2016 | Beaverson | |
| 2016/0078068 A1* | 3/2016 | Agrawal | G06F 11/1464 707/692 |
| 2016/0087931 A1 | 3/2016 | Kim | |
| 2016/0092443 A1 | 3/2016 | Hayes | |
| 2016/0164761 A1 | 6/2016 | Sathyanarayana | |
| 2016/0217387 A1 | 7/2016 | Okanohara | |
| 2016/0226970 A1 | 8/2016 | Newhouse | |
| 2016/0267103 A1 | 9/2016 | Silk | |
| 2016/0292179 A1 | 10/2016 | Muhlen | |
| 2016/0292443 A1 | 10/2016 | Von et al. | |
| 2016/0313934 A1 | 10/2016 | Isherwood | |
| 2016/0321338 A1 | 11/2016 | Isherwood | |
| 2017/0109370 A1 | 4/2017 | Newhouse | |
| 2017/0124111 A1 | 5/2017 | Sharma | |
| 2017/0124170 A1* | 5/2017 | Koorapati | G06F 16/172 |

(56) References Cited

U.S. PATENT DOCUMENTS

| | | | |
|---|---|---|---|
| 2017/0126782 A1* | 5/2017 | Koorapati | G06F 16/1844 |
| 2017/0126800 A1* | 5/2017 | Koorapati | G06F 16/10 |
| 2017/0126802 A1* | 5/2017 | Koorapati | G06F 16/27 |
| 2017/0177332 A1 | 6/2017 | DeLuca | |
| 2017/0195417 A1* | 7/2017 | Brand | H04L 67/1097 |
| 2017/0208125 A1 | 7/2017 | Jai et al. | |
| 2017/0222865 A1 | 8/2017 | Koorapati et al. | |

FOREIGN PATENT DOCUMENTS

| | | |
|---|---|---|
| JP | H816444 A | 1/1996 |
| JP | 2003030026 A | 1/2003 |
| JP | 2005011354 A | 1/2005 |
| JP | 2005141475 A | 6/2005 |
| JP | 2008538843 A | 11/2008 |
| JP | 2008305221 A | 12/2008 |
| JP | 2010074604 A | 4/2010 |
| JP | 2012079042 A | 4/2012 |
| JP | 2012079043 A | 4/2012 |
| JP | 2012093911 A | 5/2012 |
| JP | 2012513632 A | 6/2012 |
| JP | 2012182292 A | 9/2012 |
| JP | 2013182292 A | 9/2013 |
| JP | 2014038569 A | 2/2014 |
| JP | 2015058627 A | 3/2015 |
| JP | 2016505964 A | 2/2016 |
| WO | WO2009/124014 A2 | 10/2009 |
| WO | WO 2009/124014 A2 | 10/2009 |
| WO | WO-2010073110 A1 | 7/2010 |
| WO | WO2014099044 A1 | 6/2014 |
| WO | WO-2015031755 A1 | 3/2015 |
| WO | WO2015153045 A1 | 10/2015 |

OTHER PUBLICATIONS

Li, Brandon, "Simplifying Data Management: NFS Access to HDFS—Hortonworks", dated May 13, 2013, 13 pages.
European Patent Office, "Search Report" in application No. 16 791 146.0-1222, dated Dec. 7, 2018, 15 pages.
European Patent Office, "Communicaiton Pursuant to Article 94", in application No. 16 791 147.8-1222, dated Feb. 18, 2019, 5 pages.
European Claims in application No. 16 791 147.8-1222, dated Feb. 2019, 5 pages.
European Claims in application No. 16 791 146.0-1222, dated Dec. 2018, 4 pages.
Australian Patent Office, "Search Report" in application No. 2016346892, dated Jan. 21, 2019, 3 pages.
Australian Claims in application No. 2016346892, dated Jan. 2019, 9 pages.
European Patent Office, "Search Report" in application No. PCT/US2016/056345, dated Feb. 28, 2017, 20 pages.
Barr, Jeff, AWS Official Blog, "Amazon S3: Multipart Upload", dated Nov. 10, 2010, 3 pages.
Bonadea et al., "Cloud Storage", Wikipedia, daetd Oct. 28, 2015, https://en.wikipedia.org/w/index.php?title=Cloud_storage&oldid=687899972, 5 pages.
Camacho et al., "A Cloud Enviroment for Backup and Data Storage", 2014 International Conference on (CONIELECOMP), IEEE, dated 2014, 7 pages.
Current Claims in application No. PCT/US2016/0056349, dated Jan. 2017, 3 pages.
Current Claims in application No. PCT/US2016/056348, dated Jan. 2017, 4 pages.
Dee, Matt, "Inside LAN Sync", DropBox Tech Blog, dated Oct. 13, 2015, 9 pages.
European Claims in application No. PCT/US 2016/056344, dated Feb. 2017, 4 pages.
European Claims in application No. PCT/US2016/056345, dated Feb. 2017, 6 pages.
European Claims in application No. PCT/US2016/056346, dated Jan. 2017, 9 pages.
Adele Lu Jia et al., "Designs and Evaluation of a Tracker in P2P Networks", Peer-to-Peer Computing, dated 2008, 4 pages.
European Patent Office, "Search Report" in application No. PCT/US 2016/056344, dated Feb. 28, 2017, 22 pages.
Zhu et al., "Let's ChronoSync: Decentralized Dataset State Synchronization in Named Data Networking", IEEE, dated 2013, 10 pages.
European Patent Office, "Search Report" in application No. PCT/US2016/056346, dated Jan. 5, 2017, 11 pages.
European Patent Office, "Search Report" in application No. PCT/US2017/014945, dated Mar. 14, 2017, 11 pages.
Idilio Drago et al., "Inside Dropbox", Proceedings of the 2012 ACM Conference on Internet Measurement Conference, IMC, dated 2012, vol. 16, dated Nov. 14, 2012, 14 pages.
Koorapati, Nipunn, "Streaming File Synchronization", Dropbox Tech Blog, dated Jul. 11, 2014, 14 pages.
Syncovery: "Blocking Level Copying", Synovery, from the internet www.synovery.com/block-level-copying/>, dated May 22, 2014, 2 pages.
The International Searching Authority, "Search Report" in application No. PCT/US2016/0056349, dated Jan. 18, 2017, 13 pages.
The International Searching Authority, "Search Report" in application No. PCT/US2016/056348, dated Jan. 19, 2007, 14 pages.
Tridgell et al., "TR-CS-96-05 The Rsync Algorithm", dated Jun. 1996, 8 pages.
White, Tom, "Chapter 3: The Hadoop Distributed Filesystem", In: Hadoop, The Definitive Guide, dated Apr. 17, 2015.
European Claims in application No. PCT/US2017/014945, dated Mar. 2017, 4 pages.
Von Muhlen, U.S. Appl. No. 15/010,220, filed Jan. 29, 2016, Office Action, dated Sep. 28, 2017.
Von Muhlen, U.S. Appl. No. 14/961,067, filed Dec. 7, 2015, Interview Summary, dated Oct. 11, 2017.
U.S. Appl. No. 15/63,193, filed May 23, 2017, Notice of Allowance, dated Jul. 10, 2018.
U.S. Appl. No. 15/010,220, filed Jan. 29, 2016, Office Action, dated Oct. 25, 2016.
Muhlen, U.S. Appl. No. 14/961,067, filed Dec. 7, 2015, Office Action, dated Jul. 7, 2017.
Muhlen, U.S. Appl. No. 15/010,220, filed Jan. 29, 2016, Notice of Allowance, dated Feb. 22, 2018.
Muhlen, U.S. Appl. No. 15/010,220, filed Jan. 29, 2016, Final Office Action, dated Feb. 22, 2017.
Muhlen, U.S. Appl. No. 14/961,067, filed Dec. 7, 2015, Notice of Allowance, dated Nov. 6, 2017.
Korrapati, U.S. Appl. No. 15/603,193, filed May 23, 2017, Notice of Allowance, dated Jul. 10, 2018.
Koorapati, U.S. Appl. No. 15/603,193, filed May 23, 2017, Office Action, dated Sep. 11, 2017.
Koorapati, U.S. Appl. No. 15/603,193, filed May 23, 2017, Final Office Action, dated Jan. 29, 2018.
Koorapati, U.S. Appl. No. 15/355,286, filed Nov. 18, 2016, Office Action, dated Mar. 19, 2019.
Koorapati, U.S. Appl. No. 15/332,782, filed Oct. 24, 2016, Office Action, dated Oct. 5, 2018.
Koorapati, U.S. Appl. No. 15/332,782, filed Oct. 24, 2016, Final Office Action, dated Feb. 7, 2019.
Claims for Japanese Application No. 2017-550811 dated Dec. 2018, 4 pages.
Final Office Action for U.S. Appl. No. 14/979,252 dated Jul. 1, 2019, 24 pages.
Interview Summary for U.S. Appl. No. 14/979,252 dated Mar. 15, 2019, 4 pages.
Interview summary for U.S. Appl. No. 14/979,252 dated Aug. 27, 2019, 3 Pages.
Non-Final Office Action from U.S. Appl. No. 15/984,968, dated Oct. 3, 2019, 17 pages.
Office Action for U.S. Appl. No. 14/979,252 dated Dec. 14, 2018, 30 pages.
Office Action for U.S. Appl. No. 15/870,365 dated Jul. 25, 2019, 14 pages.

(56) References Cited

OTHER PUBLICATIONS

Koorapati, U.S. Appl. No. 15/355,286, filed Nov. 18, 2016, Final Office Action, dated Aug. 29, 2019.
Koorapati, U.S. Appl. No. 15/332,782, filed Oct. 24, 2016, Interview Summary, dated Oct. 23, 2019.
Koorapati, U.S. Appl. No. 14/979,252, filed Dec. 22, 2015, Interview Summary, dated Aug. 27, 2019.
Hendrickson, Mark, Dropbox The Online Storage Solution We've Been Waiting for?, Posted on Mar. 2008, at TechChurch, 6 pages.
Brim, Michael, "Extreme Scale via Group File Semantics", ProQuest Dissertations Publishing, dated 2012, Dissertation/thesis No. 3508182, 202 pages.
Claims for Japanese Application No. 2017-550817 dated Dec. 2018, 4 pages.
Claims in Australian Application No. 2016242857, dated Dec. 2018, 4 pages.
Claims in Australian Application No. 2016243644, dated Dec. 2018, 4 pages.
Dropbox Screenshot, Publically Avaiable dated Jul. 3, 2013, From http:/www.filewin.net/Dropbox/, via Internet Archive on Oct. 17, 2016, 2 pages.
European Claims in application No. PCT/US 2016/025015, dated Jun. 2016, 6 pages.
European Claims in application No. PCT/US2016/025014, dated Jul. 2016, 7 pages.
A Destination and a House are Easy File Sharing at Cloud Course of a Colet One-set! Notebook PC by Evolved type Windows Tablet Full Capture PC Cooperation vol. 19 (14), Aug. 24, 2014, pp. 30-352.
European Patent Office, "Search Report" in application No. PCT/US2016/025015, dated Jun. 16, 2016, 11 pages.
Second Examination Report for Australian Application No. 2016243644 dated Dec. 18, 2018, 4 pages.
Japan Claims in application No. 2018-504709, dated May 2019, 9 pages.
Japan Patent Office, "First Office Action" in application No. 2018-504709, dated May 31, 2019, 12 pages.
Lefebvre, Rob, Mastering iCloud on Your Mac: Use iClouDrive to Access Your Files Like Dropbox (OS X Tips) Posted on Mar. 28, 2013, at Cult of Mac, 3 pages.
Nikkei Business Publicaitons, "One Device for on the Go or at Home!, Evolution of the Notebook PC Windows Complete Strategy, PC Cooperation Volume Simple File Sharing Via Cloud" Aug. 24, 2011, 11pgs.
Notice of Acceptance for Australian Application No. 2016242857 dated Dec. 18, 2018, 3 pages.
Search Report for Japanese Application No. 2017-550811 dated Dec. 20, 2018, 6 pages.
Search Report for Japanese Application No. 2017-550817 dated Dec. 25, 2018, 8 pages.
European Patent Office, "Search Report" in application No. PCT/US2016/025014, dated Jul. 14, 2016, 11 pages.
Communication Pursuant to Article 94(3) EPC for European Application No. 16791147.8 dated Nov. 28, 2019, 4 pages.
Notice of Allowance from U.S. Appl. No. 14/979,252, dated Dec. 11, 2019, 11 pages.
Final Office Action from U.S. Appl. No. 15/332,782, dated Jan. 22, 2020, 20 pages.
Final Office Action from U.S. Appl. No. 15/984,968, dated Feb. 3, 2020, 20 pages.
Non-Final Office Action from U.S. Appl. No. 15/891,296, dated Jan. 16, 2020, 12 pages.
Non-Final Office Action from U.S. Appl. No. 15/335,286, dated Jan. 15, 2020, 5 pages.
Communication under rule 71(3) EPC for European Application No. 16715433.5 dated Jul. 20, 2020, 42 pages.

* cited by examiner

APPARENT CLOUD ACCESS FOR HOSTED CONTENT ITEMS

This application claims the benefit as a Continuation of application Ser. No. 15/355,305, filed Nov. 18, 2016, which is a continuation of application Ser. No. 15/010,235, filed Jan. 29, 2016, now U.S. Pat. No. 9,537,952 issued Jan. 3, 2017, the entire contents of each of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present application relates to online content management systems. More specifically, the example embodiments of the present invention described below relate to apparent cloud access for content items hosted with an online content management system.

BACKGROUND

People are amassing an ever-increasing amount of digital "stuff". Such stuff may include digital documents, spreadsheets, presentations, photos, videos, music, and other digital information. Until very recently, the primary way people stored all of their digital stuff was on their personal computing devices. For example, a person's digital photo collection may have been stored only on the hard drive of their laptop computer. In some cases, the photo collection may have been backed up to a personal backup storage device (e.g., an external hard drive).

Today, with the near-ubiquity of high-speed Internet connectivity and the rise of mobile computing, people are now using online content management services to store their digital stuff online. In this arrangement, a person's digital information is stored on servers operated by the online content management service and connected to the Internet or other network. Storing digital information with online content management services provides many benefits. For one, users may be able to store more stuff than they can on their personal computing devices. For example, an online content management service may offer a terabyte (TB) of storage capacity of more, while the hard drive of a user's personal computing device may have only a few hundred gigabytes (GBs) of excess storage capacity. Another benefit of storing digital information with an online content management service is that it provides resiliency to loss, theft, or failure of personal computing devices. For example, a user can have peace of mind knowing that if the user's laptop computer is lost, stolen, or breaks, the user does not lose the only copy of important documents, photos, etc. Yet another benefit of storing digital information with a content management service is that the information is available virtually anywhere there is network connectivity. For example, a user may be able to access a work document from her work computer and then continue working on the document at home using her laptop or tablet computer.

A benefit of storing digital information with an online content management service is also a potential drawback. In particular, a user may not be able to access their information without network connectivity (e.g., when the user is on an airplane). Even where network connectivity is available, access to information stored with the online content management service may be slow or unreliable or otherwise not in accord with the user's expectations.

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

BRIEF DESCRIPTION OF THE DRAWINGS

The example embodiments of the present invention are illustrated by way of example, and not in way by limitation, in the figures of the accompanying drawings and in which like reference numerals refer to similar elements and in which.

DESCRIPTION OF THE EXAMPLE EMBODIMENTS

In the following description, for the purposes of explanation, numerous specific details are set forth in order to provide a thorough understanding of the example embodiments the present invention. It will be apparent, however, that the example embodiments may be practiced without these specific details. In other instances, well-known structures and devices are shown in block diagram form to avoid unnecessarily obscuring the example embodiments.

Overview of Apparent Cloud Access for Hosted Content Items

A computer-implemented technique for apparently accessing a content item hosted in the cloud is disclosed. According to the technique, a block agent provided by an online content management service is installed on a client (e.g., a personal computing device). The online content management service operates an online content management system having a web server and a block server. A conventional user agent (e.g., a conventional web browser application) operating on the client retrieves a web page from the web server. The web page includes one or more links to one or more content items hosted with the online content management service. Each link may be activated by the user to perform a content item access action on a corresponding one of the content items.

According to the technique, when one of the links is activated, the user agent makes a block agent request to the block agent at the client. The block agent request is for the content item associated with the activated link. In response to receiving the block agent request, the block agent determines one or more content item block identifiers of one or more content item blocks that make up the requested content item. Using the one or more block identifiers, the block agent determines which, if any, of the one or more blocks are already stored at the client and which, if any, need to be downloaded from the block server of the online content management system. The block agent returns a block agent response to the block agent request from the user agent. The block agent response may be based on any block or blocks of the requested content item that are already stored at the client and any block or blocks of the requested content item that need to be downloaded from the block server. It may appear to the user of the user agent that the accessed content item is entirely downloaded from the online content item management system. In fact, however, some or all the content item may be provided by the block agent based on a block or blocks stored locally at the client, as opposed to having to download the entire content item over a network from the online content management system. In this way, the entirety of a content item hosted with an online content management service can be provided more quickly to a user via the block agent, if some or all of the block(s) that make up the content item are already stored at the client when the block agent receives the block agent request from the user agent.

The technique is described in greater detail below with respect to the Figures.

Online Content Management System Environment

Figure 1:
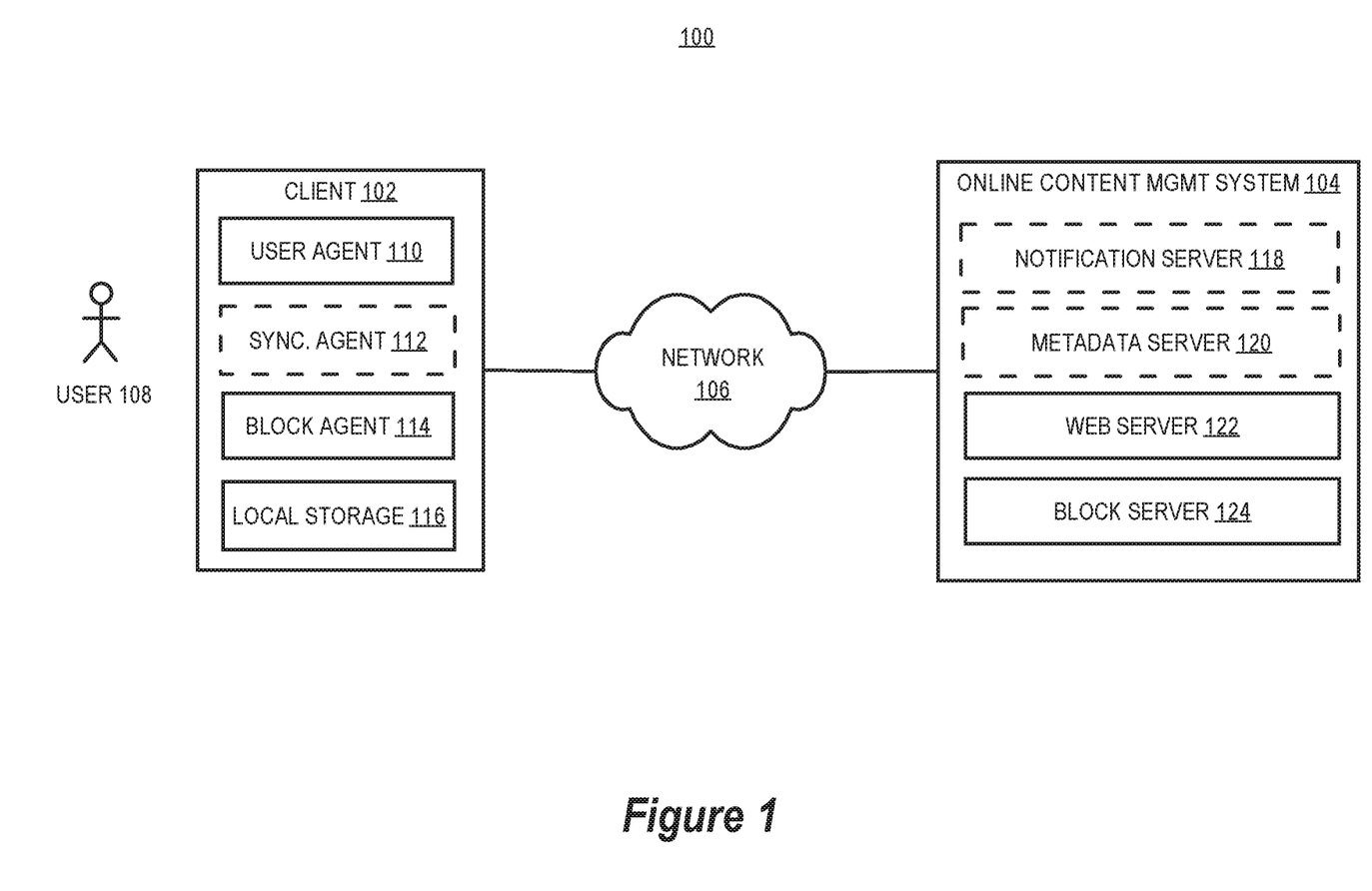
FIG. 1 illustrates an online content management system environment, which includes components for implementing apparent cloud access for hosted content items, in accordance with the disclosed embodiments.

FIG. 1 shows online content management system environment 100 in accordance with various embodiments of the present invention. Environment 100 includes a human user 108 of a client 102 of an online content management system 104. The client 102 and the online content management system 104 are connected by a network 104. The client 102 includes a user agent 110, a block agent 114, and local storage 116. Optionally, client 102 may include a content item synchronization agent 112 to facilitate content item synchronization between the client 102 and the online content management system 104. The online content management system 104 includes a web server 122 and a block server 124. Optionally, online content management system 104 includes a notification server 118 and a metadata server 120 to facilitate content item synchronization between the client 102 and the online content management system 104.

Client

The client 102 may be a stationary or mobile personal computing device such as, for example, a personal computer, a desktop computer, a workstation computer, a mobile phone, a tablet computer, a laptop computer, a gaming console, a set-top device, or other like computing device. In addition to the components shown in FIG. 1, the client 102 may be configured with other components such as, for example, the hardware components of basic computing device 400 of FIG. 4 described below and the software system 500 of FIG. 5 described below.

The client 102 has network capabilities for connecting to and communicating with the online content management system 104 over network 106. Such network capabilities may include the capability to send and receive Internet Protocol (IP) packets to and from the online content management system 104 that support network communications between the client 102 and the online content management system 104 according to an application layer protocol such as, for example, the Hyper Text Transfer Protocol (HTTP) or the Hyper Text Transfer Protocol Secure (HTTPS).

The client 102 also has local storage 116. The local storage 116 can be an electronic, magnetic, or optical data storage mechanism that is connected to the bus of the client 102 by a physical host interface (e.g., Serial Attached SCIS, Serial ATA, PCI Express, Fibre Channel, USB, or the like). For example, the data storage mechanism can be a hard disk, a solid-state drive, or an optical drive of a personal computing device. Alternatively, the local storage 116 can be a network drive, such as, for example, a network data storage device on a local area network (LAN) that is "mounted" at the client 102. By mounting the network drive, data stored in the network drive appears to user 108 and applications (e.g., user agent 110 and block agent 114) executing on the client 102 to be stored at the client 102 (i.e., on a physical drive of the device), even though the network drive is physically located across the network separate from the client 102. Once mounted, the client 102 may read and write data from and to the network drive in accordance with a network file system protocol such as, for example, the network file system (NFS) protocol for UNIX or the server message block (SMB) protocol for WINDOWS.

User Agent

The client 102 is configured with a user agent 110. The user agent 110 may be a conventional web browser application such as, for example, GOOGLE CHROME, FIREFOX, SAFARI, INTERNET EXPLORER, OPERA, ANDROID BROWSER, or other web browser application, presently available or developed in the future, that is well-known to one skilled in the art. Alternatively, the user agent 110 may be a dedicated client application such as, for example, a mobile application for an APPLE IOS-based or GOOGLE ANDROID-based mobile computing device.

In operation, the user 108 uses the user agent 110 to obtain a web page from the web server 122 of the online content management system 104. For example, the user 108 may input an address of the web page into an address bar of the user agent 110, or activate a hyperlink to the web page displayed on a video display of the client 102. The web page may be composed of web page instructions provided by the web server 122 to the client 102 over the network 106 according to the HTTP or HTTPS protocol. The web page instructions may be composed of a combination of one or more different types of web standards-based instructions. For example, the web page instructions may be composed of a combination of one or more of Hyper Text Markup Language (HTML), Cascading Style Sheet (CSS), Javascript, JavaScript Object Notation (JSON), eXtensible Markup Language (XML), or other type of web standards-based instructions, presently known or developed in the future, which are well known to one skilled in the art.

The web page, when processed by the user agent 110 and presented on a video display of the client 102, provides a listing of one or more content items associated the user's 108 user account held with the online content management system 104. A "content item" may be defined as a logical collection of digital information under management of the online content management system 104. When stored in local storage 116 of the client 102, a content item may be stored as a file in a file system. Accordingly, a content item may correspond to a known file type. For example, a content item can correspond to a document file type (e.g., a word processing document, a presentation document, a spreadsheet document, or other type of document), an image file type (e.g., a .jpg, .tiff, .gif, or other type of image file), an audio file type (e.g., a. mp3, .aiff, .m4a, .wav, or other type of audio file), a video file type (e.g., a .mov, .mp4, .m4v, or other type of video file), a web page file type (e.g., a .htm, .html, or other type of web page file), a text or rich-text file type (e.g., a .txt, .rtf, or other type of text or rich-text file), or other type of file. When stored in local storage 116, a content item can have a file system path within a file-folder hierarchy of the file system. For example, the file system path for a content item stored in a local storage might be expressed as the character string "C:\folder1\folder2\my.file" where "CA" refers to a root of the file system, "folder1\" refers to a file system folder at the root of the file system, "folder2\" refers to a file system folder with the "folder1" file system folder, and "my.file" refers to a file in the "folder2\" file system folder corresponding to the content item. The "\" character is used in the character string expression to delineate the different file system folder and file references in the character string expression.

Content Item Listing Web Page

Figure 2:
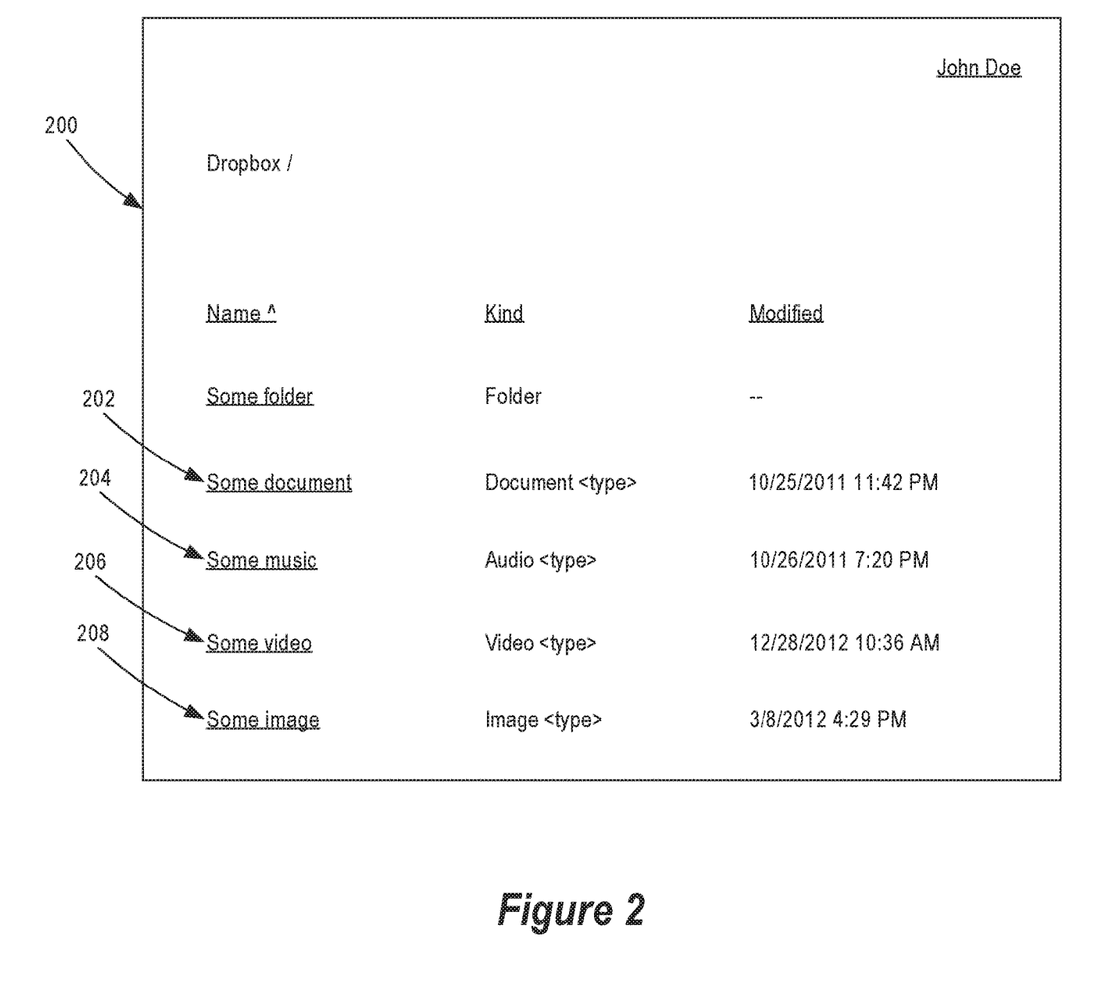
FIG. 2 depicts a graphical representation of a web page provided to a client of the online content management system by a web server of the online content management system, in accordance with the disclosed embodiments.

FIG. 2 depicts a graphical representation 200 of a web page provided to client 102 of the online content management system 104 by the web server 122 of the online content management system 104, in accordance with the disclosed embodiments. For example, the web page may be provided after the user 108 successfully authenticates with the online content management system 104 via the user agent 110.

As shown, the graphical representation 200 provides an interactive content item file-folder hierarchy view of a set of content items associated with the user's 108 account. The graphical representation also displays the user's 108 account name which, in this example, is "John Doe".

The graphical representation 200 also displays content item folders and content items for a current content item folder in the content item file-folder hierarchy. A content item folder in the content item file-folder hierarchy is a named logical container for one or more other content item folders and/or one or more content items also in the content item file-folder hierarchy. The current content item folder is indicated in the graphical representation 200. In this example, the current content item folder is the top-level or root content item folder in the content item file-folder hierarchy. Accordingly, the current content item folder is indicated as "/" in the graphical representation 200 (next to the example online content management service name "Dropbox").

The content items associated with the user's 108 account and the content item folders contained in the current content item folder are presented in the graphical representation 200 in a table below the current folder indicator. The table has three displayed columns: a name column, a kind column, and a modified column. The names of the columns are indicated in the first row of the table. The second and subsequent rows of the table correspond to a content item folder or a content item in the current content item folder. The name column contains the names of the content item folders and content items in the current content item folder. The kind column indicates the types of the content item folders and content items in the current content item folder. In particular, the kind of each content item folder or content item in the kind column indicates whether the corresponding row in the table corresponds to a content item folder or a content item and, if a content item, the content type of the content item (e.g., document, image, video, audio, etc.). The modified column contains a date of last modification of each content item in the current folder as known to the online content management system 104.

The name of each content item is also an actionable link for performing an access action on the corresponding content item. User 108 may activate an actionable link for a content item to cause the user agent 110 to perform the access action on the content item according to the web page instructions. The access action may include downloading or streaming at least a portion of the content item to the user agent 110 for presentation at the client 102 and/or storage in a file in local storage 116. If for presentation at the client 102, the presentation that occurs may vary depending on the content type of the content item. For example, if the user 108 activates actionable link 202 (e.g., with a mouse clicking or a touch gesture), then the content of document "Some Document" may be displayed on a video display of the client 102. Similarly, if the user 108 activates actionable link 208, then the image "Some Image" may be displayed on the video display. If the user 108 activates actionable link 204, then the music "Some Music" may begin to audibly play via a speaker device of the client 102. If the user 108 activates actionable link 206, then the video "Some Video" may be being to play at the client 102 via the video display and the speaker device.

Block Agent Request

According to some embodiments, when the user 108 activates an actionable link (e.g., 202, 204, 206, 207) corresponding to a content item, the web page instructions instruct the user agent 110 to send a block agent request to the block agent 114 at the client 102. The block agent request may be sent to the block agent 114 in accordance with the HTTP or HTTPS protocol. Thus, the block agent 114 may function as an HTTP or HTTPS server to the user agent 110.

The block agent request may contain information identifying a requested content item. For example, the block agent request may specify one or more of the following:

A content item identifier—A unique identifier of the requested content item.
  A content item namespace identifier—This may be an identifier of a content item namespace to which the requested content item belongs. In this case, if a content item identifier is also specified in the block agent request, then the content item identifier may be unique only within the content item namespace. A content item namespace may be defined as a group of one or more related content items under management of the online content item management system 104, typically having common access privileges. For example, the content items accessible only to user's 108 account may belong to one content item namespace and a group of content items shared among multiple user's accounts may be another content item namespace.
  A content item file-folder hierarchy path—A file system like path to the content item in the content item file-folder hierarchy. For example, referring to the listing in graphical representation 200, the path for a content item named "myfile" in the content item folder "Some Folder/" may be "/Some folder/myfile" while the path to the content item "Some Music/" may be "/Some music/".

In response to sending a block agent request to the block agent 114, the user agent 110 may receive a block agent response from the block agent 114. The block agent response may contain the requested content item as downloaded to or streamed to the user agent 110.

Block Agent

In response to receiving a block agent request for a requested content item from the user agent 110, the block agent 114 determines the identifiers of the content item blocks that make up the requested content item. A content item block may be defined as an algorithmically determined portion of a content item. For example, an algorithm may divide a content item on byte boundaries into consecutive content item blocks of a fixed block size (e.g., 4 Megabytes) such that all but the last content item block are necessarily the fixed size. The last content item block may be the fixed size or less than the fixed size depending on the total size of the content item. If the total size of the content item is less than or equal to the fixed block size, then a single content item block may make up the content item.

An identifier of a content item block may be generated by applying a cryptographic hash function to the content item block. The digest of the content item block output by the cryptographic hash function, or an encoding thereof, may be used as content item block identifier for the content item block. The cryptographic hash function can be, for example, the Secure Hash Algorithm-256 (SHA-256) that generates an almost-unique, 256-bit hash when applied to a content item block. Others well-known hash functions (e.g., MD4, MD5, SHA-1, other SHA-2 functions), presently developed or developed in the future, may be used according to the requirements of the particular implementation at hand.

A sequence of one or more content item block identifiers generated from one or more content item blocks that make up a content item may be referred to as a content item block list for the content item. For example, a content item that is 5 Megabytes in a size may be associated with a content item block list having a sequence of a two content item block identifiers: B1, B2. Content item block identifier B1 may be generated by applying a cryptographic hash function from the first 4 Megabytes of the content item and content item block identifier B2 may be generated by applying the cryptographic hash function to the remaining 1 Megabyte of the content item.

Content Item Metadata

According to one embodiment, to determine the content item block list for a requested content item in response to a receiving a block agent request from the user agent 110 for the requested content item, the block agent 114 consults content item metadata stored in the local storage 116 of the client 102. The content item metadata maps content items to a content item block lists for those content items. Specifically, the content item metadata functions as an index of content item block lists for content items. Each content item block list in the content item metadata may be associated with a unique key for that content item block list. The key may be based on one or more of the content item identifier, the content item namespace identifier, and the content item file-folder hierarchy path for the content item corresponding to the keyed content item block list. Using information in the block agent request (e.g., the content item identifier, the content item namespace identifier, and/or the content item file-folder hierarchy path for the requested content item), the block agent 114 lookup the content item block list for the requested content item in the content item metadata.

According to other embodiments, the content item block list for the requested content item is specified in the block agent request to the block agent 114. In this case, the block agent 114 may not need to consult content item metadata to determine the content item block list for the requested content item.

Determining Missing Content Item Blocks

It may be the case the none or less than all the content item blocks that make up the requested content item are stored in the local storage 116 at the client 102. In this case, the block agent 114 cannot provide the entire requested content item from local storage 116 and must download any missing content item blocks from the block server 124 of the online content management system 104. To determine which content item blocks of the requested content item are already stored in local storage 116 at the client 102, the block agent 114 uses the content item block identifiers in the content item block list for the requested content item. For example, content item block metadata may be stored in the local storage 116 which contains the content item block identifiers of the content item blocks currently stored in local storage 116.

The content item block metadata may be updated as content item blocks are added to or removed from the local storage 116 by the block agent 114. For example, the block agent 114 may update the content item block metadata after successfully downloading a content item block from the block server 124. This update may include adding to or marking as valid in the content item block metadata the content item block identifier of the downloaded content item block. The block agent 114 may also update the content item block metadata after a content item block is removed or deleted in local storage 116. This update may include removing, deleting, or marking as invalid in the content item block metadata the content item block identifier of the removed or deleted content item block.

The block agent 114 may periodically remove content item blocks stored in local storage 116 to free up available storage space in the local storage 116 for new content item blocks or for other applications. For example, the block agent 114 may periodically remove one or more the least recently accessed content item blocks stored in the local storage 116. For example, the block agent 114 may remove one or more of the least recently accessed content item blocks upon detecting that the amount of local storage 116 consumed by content item blocks does not satisfy a storage constraint. The storage constraint may be based on all of the following, or a subset or a superset thereof:

the total amount of storage space of local storage 116 currently consumed by content item blocks;
the percentage amount of storage space of local storage 116 currently consumed by content item blocks;
the total amount of storage space currently available in local storage 116; and
the percentage amount of storage space currently available in local storage 116.

The content item block metadata may also be updated by synchronization agent 112 as content item blocks are added to and removed from local storage 116 as part of content item synchronization. In particular, synchronization agent 112 may maintain a long polling connection to notification server 118. When the online content management system 104 has content item updates for the client 102, a synchronization update notification message may be sent to the synchronization agent 112 by the notification server 118 via the long polling connection. The synchronization update notification message serves to notify the synchronization agent 112 that content item updates are available from the online content management system 104. In response to receiving the synchronization update notification message, the synchronization agent 112 may contact the metadata server 120 to determine what content item updates for the client 102 are available. In this process, the metadata server 120 may return the content item block identifiers of new content item blocks the synchronization agent 112 should download from the block server 124. Upon successfully downloading these content item blocks from the block server 124, the synchronization agent 112 may update the content item block metadata. This update may include adding to or marking as valid in the content item block metadata the content item block identifiers of the downloaded content item blocks.

The synchronization agent 112 may also update the content item block metadata when content items and their constituent content item blocks are removed or deleted from the local storage 116 as part of content item synchronization. In this case, the synchronization agent 112 may remove, delete, or mark as invalid in the content item block identifiers of the content item blocks that were removed or deleted from the local storage 116 as part of content item synchronization.

The synchronization agent 112 may also update the content item block metadata when a new content item is added to local storage 116 or an existing content item in local storage 116 is edited or modified. In this case, the synchronization agent 112 may add to or mark as valid in the content item block metadata the content item block identifiers of the new content item blocks. In the case of a new content item, then all content item blocks of the new content item may be new. In the case of a modified or edited content item, then only some of the content item blocks of the modified or edited content item block may be new.

In addition to containing the content item identifiers of the content item blocks currently stored in local storage 116 at the client 102, the content item block metadata may also store, for each content item block identifier, an address of a location in local storage 116 where the identified content item block is stored. The address may be a path to or an identifier of a file in a file system that contains one or more of the content item blocks, for example.

Since a file may contain multiple content item blocks (e.g., when the file is a content item), the address associated a content item identifier in the content item metadata may specify byte offset information. The byte offset information may identify the start of the corresponding content item block within the file relative to the beginning of the file.

As an alternative, an address in the content item metadata may identify a file and be associated in the content item metadata with a content item block list. In this alternative, a particular content item block identified in the content item block list can be located within the file based on the order of content item block identifier in the content item block list and based on the same algorithm used to divide the content item into consecutive content item blocks.

Downloading any Missing Content Item Blocks

After the block agent 114 has determined that a content item block of the requested content item is not currently stored in local storage 116 at the client 102, the block agent 114 downloads the missing content item block from the block server 124. To do so, the block agent 114 may send a block server request to the block server 124 specifying the content item block identifiers of the content item blocks to be downloaded.

After downloading a content item block from the block server 124, the block agent 114 may store the content item block in local storage 116 (e.g., as part of a file). The block agent 114 may also send data of the content item block to the user agent 110 in the block agent response to the block agent request from the user agent 110. Where the requested content item is a streaming media type such as, for example, audio or video, the block agent 114 may forego persisting a downloaded content item block to local storage 116. Instead, as data of the content item block is received from the block server 124 over the network 106, the block agent 114 may stream the data to the user agent 110 without persisting the data to local storage 116. In this way, the requested content item is effectively streamed to the user agent 110 from the block server 124 via the block agent 114.

Sample Operation

The following description presents method steps that may be implemented using computer-executable instructions, for directing operation of a device under processor control. The computer-executable instructions may be stored on a computer-readable medium, such as hard disk, solid state drive, CD, DVD, flash memory, or the like. The computer-executable instructions may also be stored as a set of downloadable computer-executable instructions, for example, for downloading and installation from an Internet location (e.g., Web server).

Figure 3:
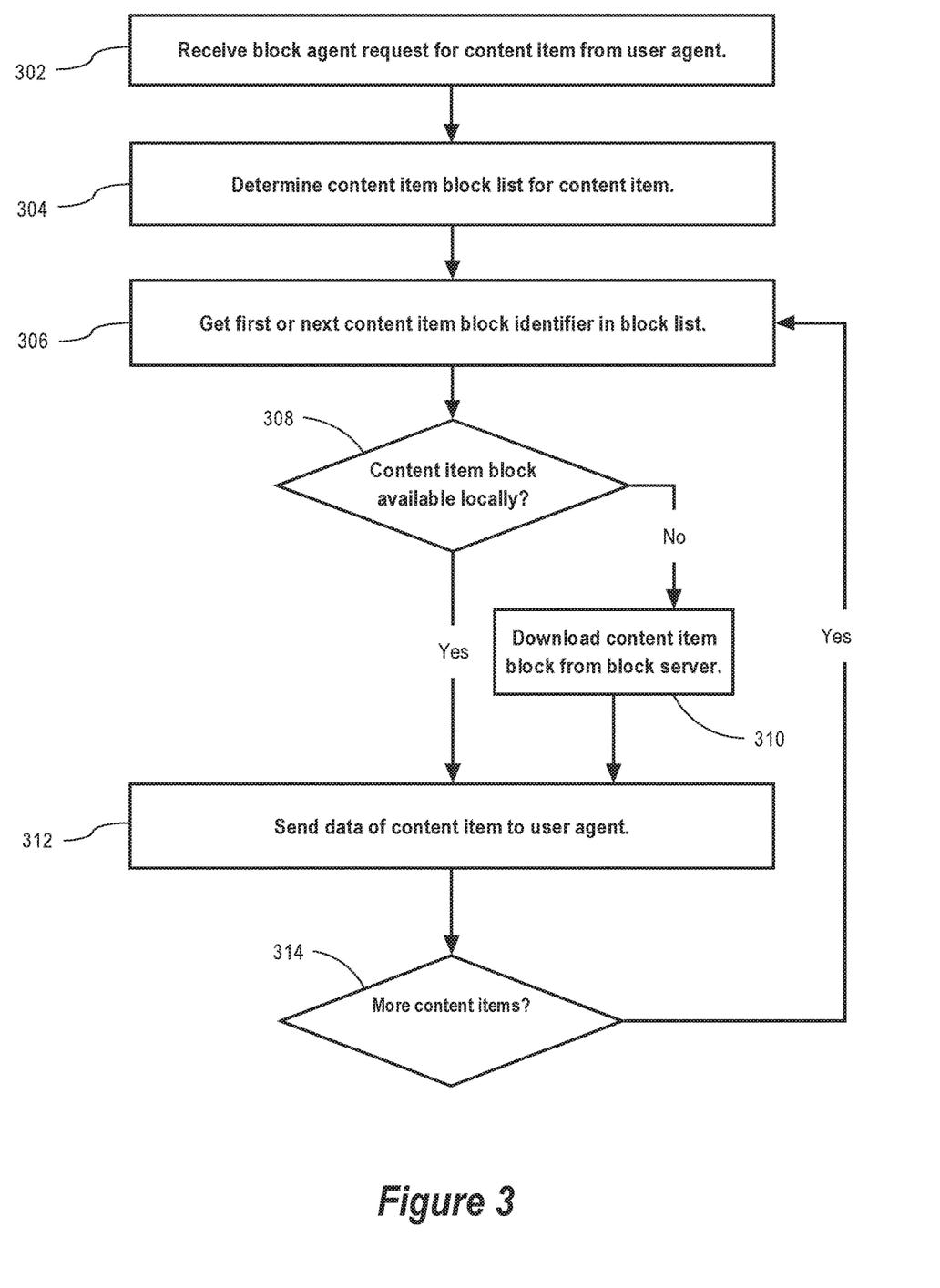
FIG. 3 depicts a process for apparent cloud access for hosted content items, in accordance with the disclosed embodiments.

FIG. 3 is a flowchart illustrating operation 300 of the block agent 114 in performing a technique for apparent cloud access of a hosted content item, according to some example embodiments of the present invention. The operations are as follows.

At operation 302, the block agent 114 receives a block agent request for a content item from the user agent 110. For example, the block agent 114 may receive the block agent request from the user agent 110 after the user 108 has activated a link to perform a content item access action on the requested content item. The content item access action can be, for example, downloading at least a portion of the requested content item to the user agent 110 and/or presenting at least a portion of the requested content item in the user agent 110.

The block agent request may identify the requested content item in various ways. In one way, the block agent request may identify the requested content item by a unique identifier of the requested content item (i.e., a content item identifier). In another way, the block agent request may identify the requested content item by a content item namespace identifier of a content item namespace to which the requested content item belongs and a content item file-folder hierarchy path of the content item. The content item file-folder hierarchy path of the requested content item can be a relative path. The relative path can be relative to the content item namespace to which the requested content item belongs. Alternatively, the relative path can be relative to a root content item namespace that the content item namespace to which the requested content item belongs is nested within. For example, a content item "my.file" may belong to a content item namespace with a content item namespace identifier of 'ABC123'. Content item namespace 'ABC123' may be nested within a root content item namespace at the path '/myfolder1/myfolder2/'. In this case, a block agent request for the content item may specify a content item namespace identifier of 'ABC123' and a content item file-folder hierarchy path of '/myfolder1/myfolder2/my.file' or a path of '/my.file'.

At operation 304, the block agent 114 determines a current content item block list for the requested content item. In some implementations, the content item block list is specified in the block agent request. However, if the content item block list is not specified in the block agent request, the block agent 114 consults content item metadata stored in the local storage 116 at the client 102. In doing so, the block agent 114 uses the content item identifier or a combination of the content item namespace identifier and the content item file-folder hierarchy path as an index into the content item metadata. The index is associated in the content item metadata with the current content item block list for the requested content item. For example, the metadata may associate the combination of the content item namespace identifier 'ABC123' and the content item file-folder hierarchy path '/myfolder1/myfolder2/my.file' with the current content item block list for the requested content item of ['B1', 'B2', 'B3'], where B1, B2, and B3 are content item block identifiers of the three content item blocks that make up the requested content item.

At operation 306, the block agent 114 obtains the first content item block identifier in the current content item block list for the requested content item.

At operation 308, the block agent 114 determines if the content item block identified by the first content item block identifier is stored locally in local storage 116 at the client 112. This determination may be made by the block agent 114 consulting content item block metadata stored in local storage 116 at the client 112. The content item block metadata contains the content item block identifiers of the content item blocks currently stored locally in local storage 116 at the client 112. In addition, the content item block metadata contains an address of a location in local storage 116 for each content item block identifier where the content item block identified by the content item block identifier is stored in local storage 116. For example, the address can be a path to a file in a file system that stores one or more identified content item blocks.

If the block agent 114 determines at operation 308 that the first content item block is not stored local in local storage 116 at the client 102, the block agent 114 downloads the first content item block from the block server 124. While in some embodiments, the block server 124 is part of the online content management system 104. In other embodiments, the block server 124 is located on-premises and co-located with the client 102. For example, the block server 124 may be a corporate file server or a peer computing device connected to the client 102 by the same local area network (LAN). To download the first content item block from the block server 124, the block agent 114 may provide the content item block identifier of the first content item block in a block server request sent to the block server 124.

If the first content item block is already stored at the client 102 or after the block agent 114 has downloaded the first content item block from the block server 124, then, at operation 312, the block agent 114 sends the data of the first content item block to the user agent 110. For example, the block agent 114 may stream or otherwise provide the data of the first content item block to the user agent 110 in a block agent response to the block agent request.

At operation 314, if there are more content item block identifiers in the current content item block list for the requested content item, then operations 306, 308, 312 and possible operation 310 are performed again for the next content item block identifier in the content item block list.

It is not a requirement of operation 300 that a content item block be entirely downloaded from the block server 124 at operation 310 before the downloaded content item block is sent to the user agent 110 at operation 312. For example, the block agent 114 may send data of a downloaded content item block at operation 312 as the data is being downloaded from the block server 124 at operation 310.

It is also not a requirement of operation 300 that a content item block be entirely sent to the user agent 110 at operation 312 before a next content item block is downloaded from the block server 124. For example, the block agent 114 may be sending data of a content item block to the user agent at operation 312 while it is also downloading a next content item block at operation 310.

Basic Computing Device

Figure 4:
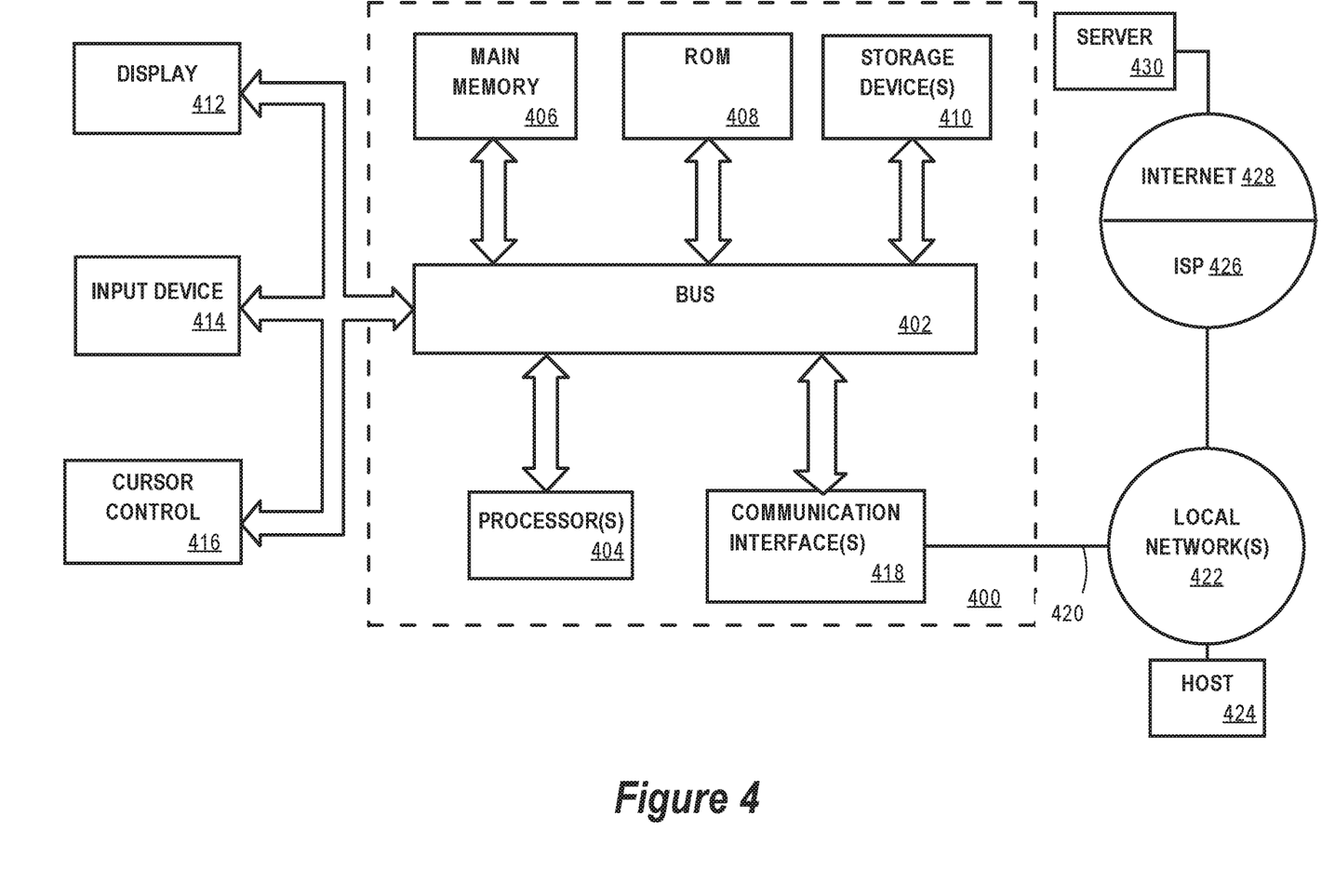
FIG. 4 is a very general block diagram of a computing device in which the example embodiments of the present invention may be embodied.

Referring now to FIG. 4, it is a block diagram that illustrates a basic computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general-purpose microprocessor, a system on a chip (SoC), or other processor.

Main memory 406, such as a random-access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world-wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

Basic Software System

Figure 5:
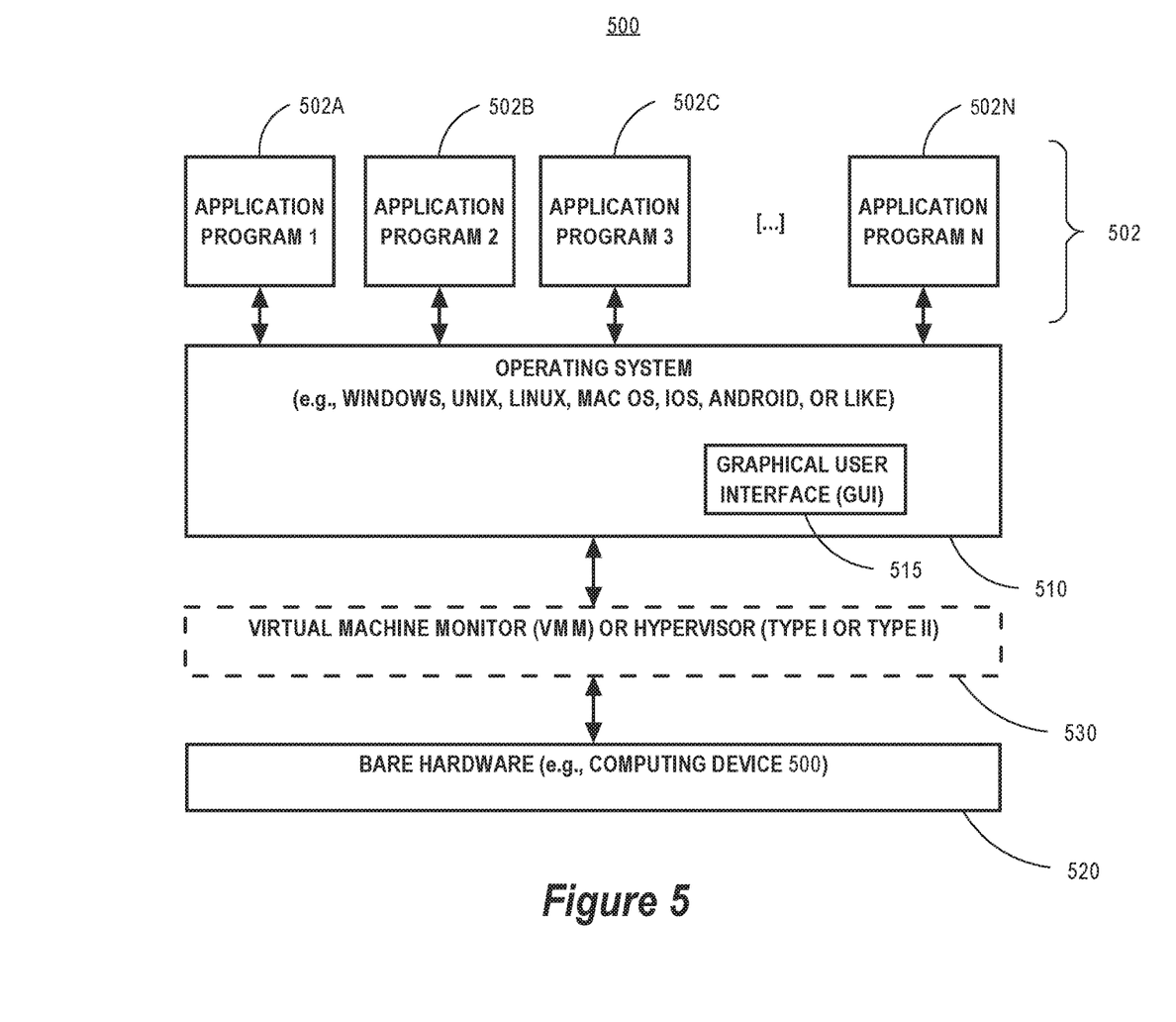
FIG. 5 is a block diagram of a basic software system for controlling the operation of the computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service). In some configurations, one or more application programs 502 may execute within a software container (e.g., a DOCKER container) that executes on the operating system 510.

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a Type I or Type II hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400. If VMM 530 is a Type I virtual machine monitor, then VMM 530 may execute directly on the bare hardware 520. If, on the other hand, VMM 530 is Type II virtual machine monitor, then VMM 530 may execute on a host operation system (not shown) that executes directly on the bare hardware 520.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

Extensions and Alternatives

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method for apparent cloud access of a content item hosted with an online content management system, the method comprising:
   receiving, at a computing device, a request from a user agent at the computing device for the content item hosted with the online content management system;
   wherein the content item is composed of one or more content item blocks;
   responsive to the receiving the request:
   determining one or more content item block identifiers of all of he one or more content item blocks of which the content item is composed, each content item block identifier of the one or more content item block identifiers identifying one respective content item block of the one or more content item blocks;
   wherein each content item block identifier of the one or more content item block identifiers is generated by the online content management system based on applying a cryptographic hash algorithm to the respective content item block of the one or more content item blocks;
   determining, based on the one or more content item block identifiers, whether any of the one or more content item blocks of which the content item is composed are stored at the computing device;
   based on determining, based on at least one content item block identifier of the one or more content item block identifiers, that at least one content item block of the one or more content item blocks of which the content item is composed is not stored at the computing device, downloading the at least one content item block to the computing device from a server of the online content management system using the content item block identifier identifying the at least one content item block; and
   responding to the request by sending the content item to the user agent, the content item sent composed of all of the one or more content item blocks including the at least one content item block downloaded.

2. The method of claim 1, wherein:
   the request comprises the one or more content item block identifiers of the one or more content item blocks of which the content item is composed; and the determining the one or more content item block identifiers of the one or more content item blocks of which the content item is composed is based, at least in part, on the request.

3. The method of claim 1, further comprising:
reading the one or more content item block identifiers of the one or more content item blocks of which the content item is composed from metadata stored at the computing device; and
wherein the determining the one or more content item block identifiers of the one or more content item blocks of which the content item is composed is based on the reading.

4. The method of claim 1, further comprising:
receiving the one or more content item block identifiers of the one or more content item blocks of which the content item is composed from a server of the online content management system; and
wherein the determining the one or more identifiers of the one or more content item block content item blocks of which the content item is composed is based on the receiving the one or more content item block identifiers.

5. The method of claim 1, further comprising:
sending a web page to the user agent, the web page comprising a link to the online content management system, the link pertaining to the content item; and
wherein the receiving the request for the content item is based on user activation at the computing device of the link of the web page.

6. The method of claim 1, wherein the one or more content item blocks of which the content item is composed are a plurality of content items blocks; and wherein the method further comprises:
initiating sending of a first content item block, of the plurality of content item blocks of which the content item is composed, to the user agent before completely downloading, from a server of the online content management system, a second content item block of the plurality of content item blocks of which the content item is composed.

7. The method of claim 1, wherein the one or more content item blocks of which the content item is composed are a plurality of content items blocks; and wherein the method further comprises:
initiating sending of a first content item block, of the plurality of content item blocks of which the content item is composed, to the user agent before completely downloading the first content item block from a server of the online content management system.

8. The method of claim 1, wherein the cryptographic hash algorithm is a secure hash algorithm.

9. One or more non-transitory computer-readable media storing one or more programs for apparent cloud access of a content item hosted with an online content management system, the one or more programs for execution by a computing device having one or more processors, the one or more programs comprising instructions configured for:
receiving, at the computing device, a request from a user agent at the computing device for the content item hosted with the online content management system;
wherein the content item is composed of a plurality of content item blocks;
responsive to the receiving the request:
determining a plurality of content items block identifiers of all of the plurality of content item blocks of which the content item is composed, each content item block identifier of the plurality of content items block identifiers identifying one respective content item block of the plurality of content item blocks;
wherein each content item block identifier of the plurality of content item block identifiers is generated by the online content management system based on applying a cryptographic hash algorithm to the respective content item block of the one or more content item blocks;
determining, based on the plurality of content item block identifiers, whether any of the plurality of content item blocks of which the content item is composed are stored at the computing device;
based on determining, based on the plurality of content item block identifiers, that none of the plurality of content item blocks of which the content item is composed are stored at the computing device, downloading the plurality of content items blocks of which the content item is composed from one or more servers of the online content management system using the plurality of content item block identifiers; and
responding to the request by sending the content item to the user agent, the content item sent composed of all of the plurality of content item blocks downloaded.

10. The one or more non-transitory computer-readable media of claim 9, wherein:
the request comprises the plurality of content item block identifiers of the plurality of content item blocks of which the content item is composed; and
the determining the plurality of content item block identifiers of the plurality of content item blocks of which the content item is composed is based, at least in part, on the request.

11. The one or more non-transitory computer-readable media of claim 9, the instructions further configured for:
reading the plurality of content item block identifiers of the plurality of content item blocks of which the content item is composed from metadata stored at the computing device; and
wherein the determining the plurality of content item block identifiers of the plurality of content item blocks of which the content item is composed is based on the reading.

12. The one or more non-transitory computer-readable media of claim 10, the instructions further configured for:
receiving the plurality of content item block identifiers of the plurality of content item blocks of which the content item is composed from a server of the online content management system; and
wherein the determining the plurality of content item block identifiers of the plurality of content item blocks of which the content item is composed is based on the receiving the plurality of content item block identifiers.

13. The one or more non-transitory computer-readable media of claim 9, the instructions further configured for:
sending a web page to the user agent, the web page comprising a link to the online content management system, the link pertaining to the content item; and
wherein the receiving the request for the content item is based on user activation at the computing device of the link of the web page.

14. The one or more non-transitory computer-readable media of claim 9, wherein the instructions are further configured for:
initiating sending of a first content item block, of the plurality of content item blocks of which the content item is composed, to the user agent before completely downloading, from a server of the online content management system, a second content item block of the plurality of content item blocks of which the content item is composed.

15. The one or more non-transitory computer-readable media of claim 9, wherein the cryptographic hash algorithm is a secure hash algorithm.

16. A computing device for apparent cloud access of a content item hosted with an online content management system, the computing device comprising:
one or more processors;
storage media;
one or more programs stored in the storage media and configured for execution by the one or more processors, the one or more programs comprising instructions configured for:
receiving, at the computing device, a request from a user agent at the computing device for the content item hosted with the online content management system;
wherein the content item, is composed of one or more content item blocks; responsive to the receiving the request:
determining the one or more content item block identifiers of all of the one or more content item blocks of which the content item is composed, each content item block identifier of the one or more content item block identifiers identifying one respective content item block of the one or more content item blocks;
wherein each content item block identifier of the one or more content item block identifiers is generated by the online content management system based on applying a cryptographic hash algorithm to the respective content item block of the one or more content item blocks;
determining, based on the one or more content item block identifiers, whether any of the one or more content item blocks of which the content item is composed are stored at the computing device;
based on determining, based on at least one content item block identifier of the one or more content item block identifiers, that at least one content item block of the one or more content item blocks of which the content item is composed is not stored at the computing device, downloading the at least one content item block to the computing device from a server of the online content management system using the content item block identifier identifying the at least one content item block; and
responding to the request by sending the content item to the user agent, the content item sent composed of all of the one or more content item blocks including the at least one content item block downloaded.

17. The computing device of claim 16, wherein:
the request comprises the one or more content item block identifiers of the one or more content item blocks of which the content item is composed; and
the determining the one or more content item block identifiers of the one or more content item blocks of which the content item is composed is based, at least in part, on the request.

18. The computing device of claim 16, the instructions further configured for:
reading the one or more content item block identifiers of the one or more content item blocks of which the content item is composed from metadata stored at the computing device; and
wherein the determining the one or more content item block identifiers of the one or more content item blocks of which the content item is composed is based on the reading.

19. The computing device of claim 16, the instructions further configured for:
receiving the one or more content item block identifiers of the one or more content item blocks of which the content item is composed from a server of the online content management system; and
wherein the determining the one or more content item block identifiers of the one or more content item blocks of which the content item is composed is based on the receiving the one or more content item block identifiers.

20. The computing device of claim 16, wherein the cryptographic hash algorithm is a secure hash algorithm.

* * * * *

UNITED STATES PATENT AND TRADEMARK OFFICE
CERTIFICATE OF CORRECTION

PATENT NO. : 10,819,559 B2  
APPLICATION NO. : 15/870365  
DATED : October 27, 2020  
INVENTOR(S) : Nipunn Koorapati et al.

Page 1 of 1

It is certified that error appears in the above-identified patent and that said Letters Patent is hereby corrected as shown below:

Column 16  
Claim 1: Line 36: Delete "he" and insert --the--.

Column 17  
Claim 4: Line 19: After "more" and before "identifiers", insert --content item block--.  
Line 20: Delete "block content item".

Signed and Sealed this  
Twenty-ninth Day of December, 2020

Andrei Iancu  
*Director of the United States Patent and Trademark Office*